United States Patent [19]

Paulik et al.

[11] Patent Number: 4,597,036
[45] Date of Patent: Jun. 24, 1986

[54] BLOCKING OSCILLATOR POWER PACK

[75] Inventors: Ernst Paulik, Hilgertshausen; Güenther Peruth, Munich, both of Fed. Rep. of Germany

[73] Assignee: Siemens Aktiengesellschaft, Berlin & Munich, Fed. Rep. of Germany

[21] Appl. No.: 629,223

[22] Filed: Jul. 9, 1984

[30] Foreign Application Priority Data

Oct. 6, 1983 [DE] Fed. Rep. of Germany ....... 3336422

[51] Int. Cl.$^4$ ........................................... H02M 3/335
[52] U.S. Cl. ...................................... 363/21; 363/97; 363/56
[58] Field of Search ....................... 363/20, 21, 56, 57, 363/37, 97; 331/112, 117

[56] References Cited

U.S. PATENT DOCUMENTS

| 4,371,917 | 2/1983 | Bator | 363/21 |
| 4,439,820 | 3/1984 | Kühn et al. | 363/21 |
| 4,459,651 | 7/1984 | Fenter | 363/97 |

Primary Examiner—Peter S. Wong
Assistant Examiner—Judson H. Jones
Attorney, Agent, or Firm—Hill, Van Santen, Steadman & Simpson

[57] ABSTRACT

A blocking oscillator power pack is based on a conventional design in which the transformer supplied by way of a rectified line alternating voltage is provided with a first secondary winding which supplies an electrical device, as a load, by way of a further rectifier and with a secondary winding which serves for the supply of a control circuit. As a final control element, the control circuit contains a switching transistor by way of which the current in the primary winding of the transformer is adjusted. It has been shown, however, that an undesired rise of the secondary current is also possible due to a failure of the control circuit. In order to suppress such rise, a protective circuit is provided which remains inactive given intact operation of a control circuit. When, however, the current in the secondary circuit transgresses a prescribed maximum value, the protective circuit is initiated and inhibits the primary current flowing via the switching transistor until the malfunction in the control loop has been dismantled. In particular, the protective circuit has an inhibiting effect on the output of the control circuit.

2 Claims, 3 Drawing Figures

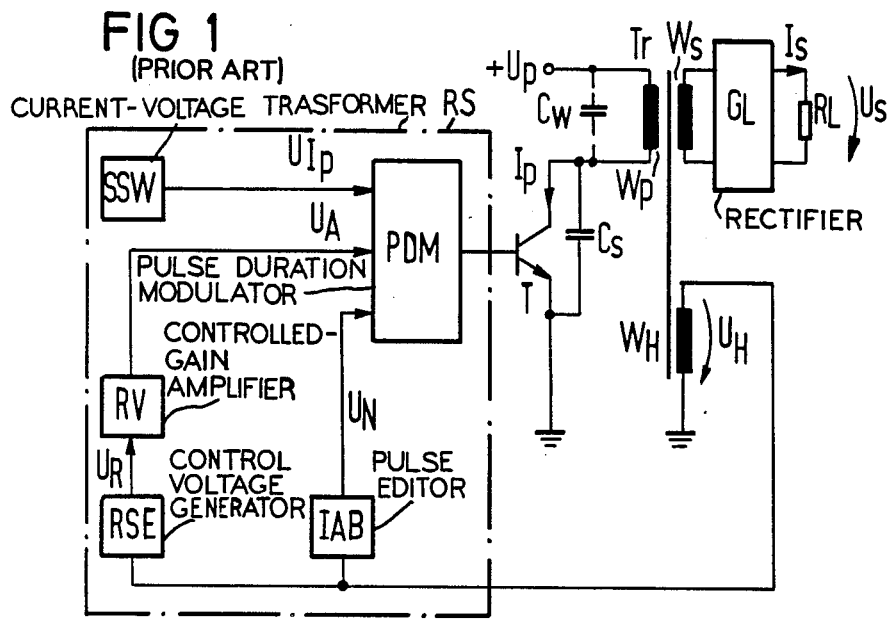
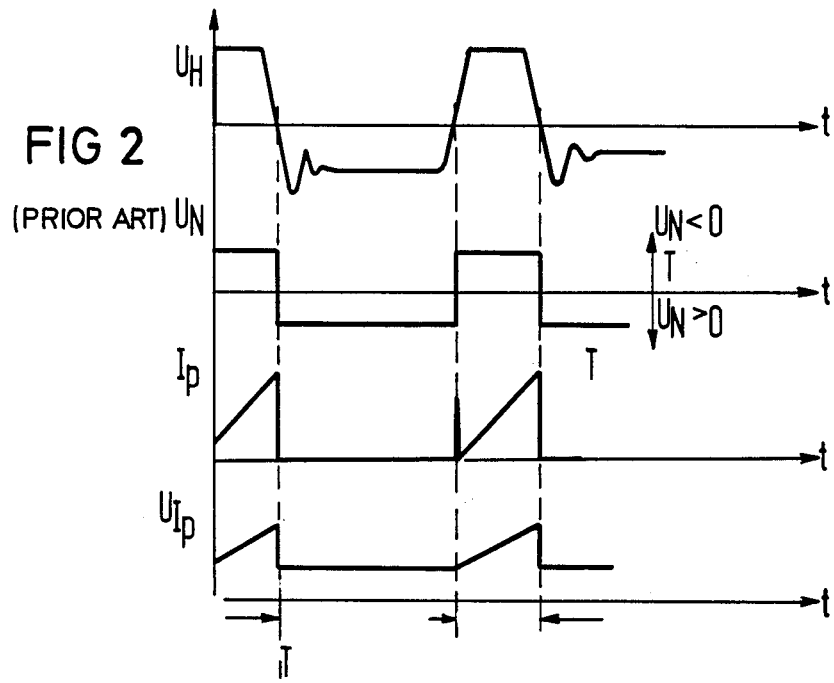

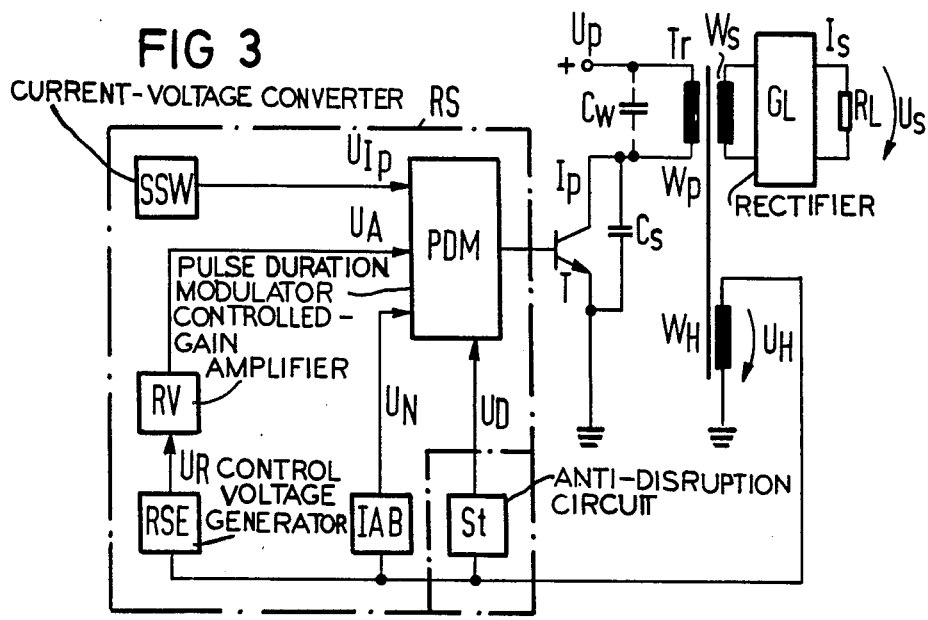
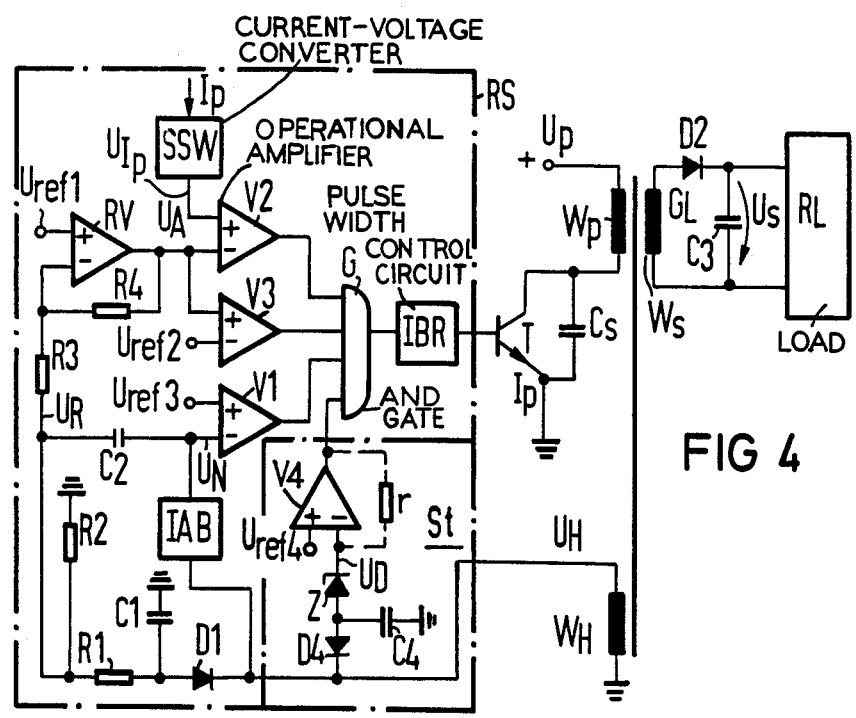

BLOCKING OSCILLATOR POWER PACK

BACKGROUND OF THE INVENTION

1. Field of the Invention

The present invention relates to a blocking oscillator power pack for supplying an electric device in which the primary winding of the transformer is connected in series with a segment of a switching transistor carrying current to be switched, being connected in series therewith to a direct voltage obtained by way of rectification of the line alternating voltage supply via two external supply terminals, and in which a secondary winding of the transformer is provided for the power supply of the electric device, and further in which the control electrode of the switching transistor is controlled by the output of the control circuit which is, in turn, charged with the rectified line alternating voltage as an actual value and by a reference value generator.

2. Description of the Prior Art

Blocking oscillator power packs are disclosed, for example in the publication "Funkschau", 1975, No. 5, pp. 40–44, in the German published application No. 30 32 034, and in the German published application No. P 33 30 039.9.

As known, such a power pack has the task of supplying an electronic device, for example a television receiver, with stabilized and regulated operating voltages. The core of such a power pack is therefore provided by a control circuit whose final control element is realized by way of a switching transistor, particularly by way of a bipolar power transistor. The fundamental circuit diagram appertaining to such a power pack is illustrated in FIG. 1 and is discussed first herein.

An npn power transistor T serves as the final control element for a control circuit RS and has its emitter/collector segment connected in series with a primary winding $W_p$ of a transformer TR. With reference to FIG. 1 of the German published application No. 30 32 034, it can thereby be determined that the direct voltage operating this series connection is obtained by way of rectification of the alternating voltage supplied by the a.c. network with a rectifier circuit, for example a bridge rectifier. Given the use of an npn transistor T, the emitter of the transistor is connected to a reference potential (ground), the collector lies at the primary winding $W_p$ of the transformer Tr and the other end of the primary winding is connected to the supply potential $+U_p$ supplied by the rectifier circuit (which, however, is not shown on the drawings). The emitter-collector segment of the transistor T is bridged by a capacitor $C_s$, whereas a capacitor $C_w$ indicated at the primary winding $W_p$ is of a parasitic nature. At its base, the power transistor T is controlled by the output portion of the control circuit RS, which is preferably represented by a pulse duration modulator PDM.

An auxiliary winding $W_H$ of the transformer Tr, which is designed as a secondary winding in the illustrated exemplary case, serves as a sensor for the control circuit RS and therefore has its one end connected to the reference potential and its other end connected to the input of the control circuit RS. A further secondary winding $W_s$ serves the purpose of charging the electrical device $R_L$ to be supplied upon mediation of a rectifier system $G_L$ which forwards the direct voltage $U_s$ to the device.

In the examples illustrated on the drawings, the control circuit RS comprises an output circuit portion PDM which controls the transistor T and is designed as a pulse duration modulator and of two input portions controlled by the auxiliary winding $W_H$, whereby the one input portion RSE serves for generating the control voltage and emits a control signal $U_A$ for the output portion PDM via a controlled-gain amplifier RV. The other input portion IAB serves the purpose of pulse editing and supplies a signal $U_N$ to the output portion PDM of the control circuit RS. Finally, a current-voltage transformer SSW is also provided which forms the actual value control of the control circuit RS and emits a voltage $U_{Ip}$ to the pulse duration modulator that is proportional to the primary current $I_p$. The last-mentioned portions of the control circuit RS are likewise set forth in the aforementioned German published application No. 30 32 034. They belong to the control circuit illustrated in FIG. 3 thereof. The control voltage generation is provided therein by the resistors R5 and R4 to be seen in FIGS. 1 and 2 thereof. The pulse editor IAB comprises a zero passage identifier and a control logic charged by the identifier that may be seen in FIG. 3 of the aforementioned German published application. The pulse duration modulator PDM, finally, is represented by the trigger circuit indicated in the German published application No. 30 32 034 together with that portion of the control logic that is charged by the trigger circuit.

The timing diagram appertaining to a circuit according to FIG. 1 of the present application, i.e. the chronological behavior of the signals appearing in the control circuit, namely the signals $U_H$ (the signal emitted by the transformer winding $W_H$ for the control of the control circuit), $U_N$ (the signal supplied by the pulse editor IAB), $I_p$ (the current supplied by the transformer winding $W_p$ which is connected in series with the switching transistor T), and $U_{Ip}$ (the actual value signal supplied by the current-voltage transformer SSW) is shown in FIG. 2.

As may be seen, the voltage $U_H$ having the zero passage ($U_H=0V$) which is supplied by the transformer winding $W_H$ supplies the information that the energy stored in the transformer Tr has flowed off and a new charging cycle can begin, i.e. the switch given by the transistor T can be closed. This information is communicated to the pulse duration modulator PDM via the pulse editing stage IAB. (Is therefore true that $U_N>0$ volts ' pulse start, $U_N<0$ volts → no pulse start possible).

A control voltage $U_R$, which is proportional to the secondary voltage $U_s$, is also acquired with the assistance of the control voltage generator RSE from the signal voltage $U_H$ supplied by the winding $W_H$ of the transformer Tr. The control voltage is compared to a reference in the control-gain amplifier RV. The difference between the control voltage $U_R$ and the reference is amplified by the controlled-gain amplifier RV and the signal voltage $U_A$ supplied by the output thereof is communicated to the pulse duration modulator PDM which compares it to the signal $U_{Ip}$ of the current-voltage transformer SSW and opens the switch represented by the transistor T as soon as $U_{Ip}=U_A$ is valid. The peak value $I_{pmax}$ of the current $I_p$ is corrected in this manner until the difference between the voltage $U_R$ and the reference voltage disappears. This means that the voltage $U_R$ and, therefore, the voltage $U_s$ remain constant.

Given blocking oscillator power pack of the type just described, but also generally given was of the type initially defined, it has been observed that, given certain disruption cases at the primary side of the transformer Tr, the power packs have a tendency to lead to a great super-elevation of the secondary voltages which can, under given conditions, lead to destruction in the load circuit charged by the power pack. Such disruption can be caused, for example, due to defects in the components forming the power pack, due to transgression of tolerances, due to contact interruptions, etc.

SUMMARY OF THE INVENTION

The object of the present invention, therefore, is to provide a suitable alleviation for the problem set forth above.

Given a blocking oscillator power pack corresponding to the definition initially set forth, it is provided, according to the present invention, that an anti-disruption circuit be provided which is inactive given proper operation of the control circuit and which is, in turn, charged by a secondary voltage of the transformer, and is designed such that it spontaneously shuts off the current flowing in common across the switching transistor and the primary winding of the transformer in response to transgression of prescribed limit value by the current arising in a secondary winding.

In order to achieve the aforementioned goal, another object of the invention is to provide a cost-effective circuit which, above all else, is also suitable for the execution of the blocking oscillator power packs disclosed in the aforementioned German published application No. 30 32 034 or, respectively, in the German application No. P 33 30 039.9 or, respectively, in the German application No. P 33 12 209.1.

In the interest of the freedom from disruption of the secondary circuit containing the electrical device to be charged, it is also important that the secondary winding assigned to the anti-disruption circuit not be provided for charging the anti-disruption circuit, but that the secondary winding provided for charging the control circuit according to the embodiment of FIG. 1 or, under given conditions, a further secondary winding, be provided for this purpose. It is also advantageous when the protection circuit is designed such that it participates in the control of the output of the control circuit RS which is provided with a charging of the control electrode of the switching transistor T.

The following properties of the control circuit RS illustrated in FIG. 1 should also be considered before proceeding with a description of the present invention, which is illustrated in FIGS. 3 and 4. When, particularly given this embodiment, action is taken within the pulse editing control IAB or in the control voltage generator RSE or on the control-gain amplifier RV due to a disturbance, i.e. component modification, interruption or short, then one must rely on a boost in the secondary voltage $U_s$ which can lead to the destruction of the circuit portions GL or, respectively RL, charged by the secondary winding $W_s$.

The regulation standards covering such devices, however, stipulate that no voltage boost at the side of the power pack not connected to the network must not occur given the appearance of a disturbance at the side of the power pack that is connected to the network. This is particularly critical given an operating state (readiness or standby mode) which only functions with minimum load ($R_L$ is high) in comparison to the normal load $R_L$. In order to alleviate this situation, it is conventional to provide a voltage limiter at the secondary side containing the device to be charged.

It is therefore an object of the invention to only act on the control system and inhibit the switching transistor T when the voltage $U_s$ rises above an amount to be fixed.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a power pack known in the art;

FIG. 2 is a voltage and current verses time diagram showing the operation of the circuit of FIG. 1;

FIG. 3 is a schematic representation of an embodiment of the invention; and

FIG. 4 is a detailed schematic diagram of an embodiment of the invention.

DESCRIPTION OF THE PREFERRED EMBODIMENTS

As may be seen from FIG. 3, the pulse duration modulator PDM is provided with a further input which is charged by a voltage $U_D$ supplied by an anti-disruption circuit St. As already indicated, the same secondary winding $W_H$ which also serves for charging the control circuit RS is also responsible for charging the anti-disruption circuit ST.

A particularly advantageous construction of the invention is shown in FIG. 4, this, apart from the antidisruption circuit St of the invention, corresponding to FIG. 5 of the aforementioned German patent application NO. P 33 12 209.1.

Given this embodiment of the invention, the control voltage generator RSE charged by the auxiliary secondary winding $W_H$ is realized by the combination of a diode D1 having two resistors R1 and R2 and a capacitor C1. The cathode of the diode D1 is directed connected to the secondary winding $W_H$ of the transformer Tr and its anode is connected to a reference potential (ground) by way of, on the one hand, the capacitor C1 and, on the other hand, by way of the series connection of the two resistors R1 and R2. The control voltage generation therefore comprises a loaded half-wave rectification with the diode D1 as a rectifier which is conductive during the inhibit phase (the switch represented by the power transistor T is open), with the capacitor C1 as a charging capacitor and with the two resistors R1 and R2 as load resistors. The controlled-gain amplifier is advantageously represented by an operational amplifier whose non-inverting input is connected to a first reference voltage $U_{ref1}$ and whose inverting input is connected by way of a resistor R4 to the output of the operational amplifier RV and is also charged by the output of the control voltage generator RSE via a resistor R3. A capacitor C2 which is itself charged by the output of the control voltage generator RSE and, on the other hand, by the output of the pulse editor IAB is connected to the inverting input of a further operational amplifier V1 which forms an input of the pulse duration modulator PDM. The capacitor C2 functions as a switching control. Details regarding this are set forth in the aforementioned German application No. P 33 12 209.1. The current-voltage transformer SSW is charged by a current $I_p$ flowing via the primary winding $W_p$ and can function as a direct current collector by way of a resistor in the ground branch of the switching transistor or according to the principle of $I_p$ simulation.

The output of the pulse duration modulator PDM is realized by a suitable logic element, particularly by way of an AND gate G which acts on the control electrode of the switching transistor T, preferably via a pulse width control circuit IBR. In the illustrated exemplary embodiment, the AND gate has four inputs, of which one, in accordance with the invention, is provided exclusively for being charged by way of the output of the anti-disruption circuit St.

Each of the four inputs of the AND gate G in FIG. 4 has the output of a respective operational amplifier V1-V4 assigned thereto. One of these operational amplifiers, namely the operational amplifier V1, is charged by the output of the pulse editor IAB, as already pointed out, and is connected to the control voltage generator via the capacitor C2. The non-inverting input of the operational amplifier V1 is driven by a reference voltage $U_{ref3}$.

The second of the operational amplifiers, that is the operational amplifier V2, is connected at its non-inverting input to the output of the current-voltage transformer SSW and has its inverting input connected to the output of the controlled-gain amplifier RV. The third operational amplifier V3 for charging the AND gate G is connected at its non-inverting input to the output of the control-gain amplifier RV and to the output of the controlled-gain amplifier RV via the resistor R4 and the resistor R3, whereas a further reference voltage $U_{ref2}$ is connected to its inverting input.

Up to this point, the circuit according to FIG. 4 agrees with that of the aforementioned circuit of the German application No. P 33 12 209.1, with the exception that the AND gate G only has three signal inputs and here the AND gate has four signal inputs. According to the invention, the AND gate G has yet another, the fourth, input which is connected to a fourth operational amplifier V4 which is a part of the anti-disruption circuit St. The fourth operational amplifier V4 is controlled at its non-inverting input by a further reference voltage $U_{ref4}$ and has its inverting input connected to the cathode of a Zener diode Z. The anode of the Zener diode Z is connected, on the one hand, to the reference potential (ground) by way of a capacitor C4 and is connected to the input of the control circuit RS (i.e. in common with the cathode of the diode D1 and the pulse editor IAB) by the one end of the secondary winding $W_H$ of the transformer Tr.

When, given the circuit according to FIG. 4, the pulse duration modulator PDM is controlled such as a consequence of a disruption of the potentials $U_N$, $U_A$ or $U_{Ip}$ that the secondary voltage Us increases, then the voltage $U_H$ likewise arises in the ratio of the windings $W_s:W_H$. As a result of the diode D4 provided in the protective circuit St, the capacitor C4 is charged with the negative component of the voltage $U_H$. Upon transgression of the comparison voltage prescribed by the Zener diode Z, a voltage which it supplies to the input of the operational amplifier V4 takes effect at its output. Since this, due to the illustrated connections, has a switching function, the charging applied from its output to the appertaining input of the AND gate G is terminated, so that the level LOW remains at the output of the AND gate G, regardless of the logical state of its remaining inputs, and the pulse width control IBR, as well as the switching transistor T controlled by the pulse width control IBR, are therefore also disabled. The inhibit of the AND gate G is maintained until the charge of the capacitor C4 has again decreased below the comparison voltage defined by the Zener diode Z. When, as indicated in FIG. 4, that input of the operational amplifier V4 which is connected to the Zener diode Z is connected to the output thereof by way of a resistor r, then one obtains the effect of a self-holding circuit. However, it is also possible to design the operational amplifier V4 as a Schmitt trigger.

Essential to the invention, therefore, is that, given a disturbance within that side of the power pack which is connected to the network, a sensor perceives whether a voltage superelevation occurs at the secondary side and, when and only when this is the case, inhibits the switching transistor at the network-connected side.

Although we have described our invention by reference to particular illustrative embodiments thereof, many other changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In blocking oscillator power pack of the type in which a switching transistor is connected in series with the primary winding of a transformer connected to a rectified line voltage current to be switched, in which a first secondary winding is provided for connection to a load, in which a second secondary winding derives a control voltage representing the voltage across the primary winding, and in which a control circuit is connected between the second secondary winding and a control electrode of the switching transistor, said control circuit also connected to the rectified line voltage supply providing an actual value and including a reference value generator and operable to control the switching of the switching transistor, the improvement comprising:

an anti-disruption circuit in the control circuit connected to the secondary winding and operable to inhibit conduction of the switching transistor in response to the control voltage exceeding a predetermined limit value, said control circuit further comprising a pulse width regulator connected to the control electrode of the switching transistor, gate means connected between said pulse width regulator and said anti-disruption circuit, and means in said anti-disruption circuit for defining the predetermined limit value and comparing the control voltage thereto, and said anti-disruption circuit further comprising a capacitor connected to a reference potential, a Zener diode connected to said capacitor, an operational amplifier including an output connected to said gate means, a first input connected to said Zener diode, and a second input connected to a reference potential, and a diode connecting the junction of said Zener diode and said capacitor to the second secondary winding.

2. The improved power pack of claim 1, and further comprising:

a resistor connected to said first input and to said output of said operational amplifier.

* * * * *